(12) United States Patent  
Yang et al.

(10) Patent No.: US 10,537,873 B2  
(45) Date of Patent: Jan. 21, 2020

(54) SYNTHESIS AND APPLICATION OF MOFS/NATURAL POLYMERS COMPOSITE BEADS ADSORBENTS

(71) Applicant: NANJING NORMAL UNIVERSITY, Nanjing (CN)

(72) Inventors: Weiben Yang, Nanjing (CN); Zhen Yang, Nanjing (CN); Ning Zhuo, Nanjing (CN); Xia Zhou, Nanjing (CN); Jiachun Shen, Nanjing (CN); Xuntong Zhang, Nanjing (CN); Xuzeng Wang, Nanjing (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 7 days.

(21) Appl. No.: 15/774,841

(22) PCT Filed: Dec. 12, 2016

(86) PCT No.: PCT/CN2016/109511  
§ 371 (c)(1),  
(2) Date: May 9, 2018

(87) PCT Pub. No.: WO2017/133324  
PCT Pub. Date: Aug. 10, 2017

(65) Prior Publication Data  
US 2018/0339284 A1 Nov. 29, 2018

(30) Foreign Application Priority Data  
Feb. 4, 2016 (CN) .......................... 2016 1 0080071

(51) Int. Cl.  
*B01J 20/22* (2006.01)  
*C08L 5/08* (2006.01)  
(Continued)

(52) U.S. Cl.  
CPC ............. *B01J 20/226* (2013.01); *B01J 20/24* (2013.01); *B01J 20/267* (2013.01);  
(Continued)

(58) Field of Classification Search  
CPC ............................... B01J 20/226; B01K 20/24  
See application file for complete search history.

(56) References Cited

FOREIGN PATENT DOCUMENTS

| CN | 103313720 A | 9/2013 |
|---|---|---|
| CN | 105498695 | 4/2016 |
| CN | 105566660 A | 5/2016 |

OTHER PUBLICATIONS

Kang, Chao-Hsiang, et al. "Synthesis of ZIF-7/chitosan mixed-matrix membranes with improved separation performance of water/ethanol mixtures." Journal of membrane science 438 (2013): 105-111 (Year: 2013).*

(Continued)

*Primary Examiner* — Anthony J Zimmer  
*Assistant Examiner* — Ricardo D Morales  
(74) *Attorney, Agent, or Firm* — Zhihua Han; Wen IP LLC

(57) ABSTRACT

The present invention discloses the Synthesis and application of MOFs/natural polymers composite beads adsorbents. To overcome the drawback of MOFs, in an embodiment, both novel MOFs/sodium alginate (MOFs/SA) and MOFs/chitosan (MOFs/CS) composite beads were prepared and characterized. Each composite beads include one or more of MIL-101 (Cr), MIL-100 (Cr), MIL-53 (Al), MIL-100 (Al), NH$_2$-MIL-101 (Al), UIO-66, ZIF-8, ZIF-68, ZIF-67, and ZIF-9-67 nanoparticles. Adsorption of anionic contaminants onto the two composite beads was investigated and compared with pristine sodium alginate beads (SA) and chitosan beads (CS). The novel MOFs/SA beads all exhibit much higher adsorption capacity than SA beads; the novel MOFs/

(Continued)

CS beads all exhibit much higher adsorption capacity than CS beads, which indicates that MOFs played a key role in the adsorption of anionic contaminants. The porous composite beads disclosed herein and related methods and devices may be used in adsorption technologies.

9 Claims, 8 Drawing Sheets

(51) Int. Cl.
*C08J 3/14* (2006.01)
*C08L 5/04* (2006.01)
*B01J 20/28* (2006.01)
*B01J 20/26* (2006.01)
*B01J 20/30* (2006.01)
*B01J 20/24* (2006.01)
*B01J 31/16* (2006.01)
*C02F 1/28* (2006.01)

(52) U.S. Cl.
CPC ..... *B01J 20/28026* (2013.01); *B01J 20/3085* (2013.01); *B01J 31/1691* (2013.01); *C02F 1/285* (2013.01); *C08J 3/14* (2013.01); *C08L 5/04* (2013.01); *C08L 5/08* (2013.01); *B01J 2220/4825* (2013.01); *C08J 2305/08* (2013.01)

(56) References Cited

OTHER PUBLICATIONS

O'Neill, Laura D., Haifei Zhang, and Darren Bradshaw. "Macro-/microporous MOF composite beads." Journal of Materials Chemistry 20.27 (2010): 5720-5726 (Year: 2010).*

* cited by examiner

SYNTHESIS AND APPLICATION OF MOFS/NATURAL POLYMERS COMPOSITE BEADS ADSORBENTS

TECHNICAL FIELD

The present invention belongs to the field of adsorbents, specifically it relates to the synthesis and application of MOFs/natural polymers composite beads adsorbents.

BACKGROUND OF THE INVENTION

Pharmaceuticals have become important emerging contaminants, due to their presence in environmental waters (following incomplete removal in wastewater treatment or diffuse-source contamination), threat to drinking water, and concern about possible estrogenic and other adverse effects, both to wildlife and humans. A major concern for pharmaceuticals also includes the development of bacterial resistance (creation of "Super Bugs") from the release of antibiotics to the environment, and there are also concerns that antibiotics will decrease biodegradation of leaf and other plant materials, which serves as the primary food source for aquatic life in rivers and streams. It is estimated that approximately 3000 different substances are used as pharmaceutical ingredients, including painkillers, antibiotics, antidiabetics, betablockers, contraceptives, lipid regulators, antidepressants, and impotence drugs. Pharmaceuticals are introduced not only by humans but also through veterinary use for livestock, poultry, and fish farming, as various drugs are commonly given to farm animals to prevent illness and disease and to increase the size of the animals.

Metal-organic frameworks (MOFs), which are crystalline porous materials constructed from multifunctional ligands and metal ions, have drawn considerable attention for environmental remediation purposes owing to their high porosity and tenability. Particularly, most studies concerning adsorption have investigated dyes, organoarsenic, phenols, and heavy metal removal using MOFs nanoparticle from the liquid phase, with the large adsorption capacity and fast adsorption kinetics. However, the use of MOFs nanoparticle is heavily restricted due to their poor separability because significant post-treatment filtration or centrifuge is required to remove the MOFs from the purified water, and obvious loss of adsorbents is quite possible to happen during such processes. To overcome the shortcoming, immobilization of active micro- or nanoscale particle appears to provide an approach.

Natural polymers have been long favored due to their additional advantages of being inexpensive, plentiful, non-toxic, and renewable, such as sodium alginate and chitosan, which can be easily formulated into a few millimeters beads easily separated from a liquid medium. The flexibility of nano-particles incorporation into sodium alginate and chitosan are considered to be an excellent way to immobilize active micro- or nanoscale particles and present novel composite adsorbents. Among over 10,000 MOF materials, there are several transition-metal-based MOFs that are stable under liquid phase reaction conditions. These include mesoporous chromium(III) terephthalate (MIL-101), . . . . Due to the high stability, these MOFs exhibits no detectable leaching of metal ions into solutions, allowing its safe use in different applications. In addition, these MOFs possess high densities of transition metal ions with Lewis acid properties, which can be stable under acid conditions. The resulting composite materials are effective removal for pharmaceuticals.

SUMMARY OF THE INVENTION

In some embodiments, the present invention provides composite beads adsorbents for pharmaceuticals capture. Such composite materials generally include: (1) a MOFs source; and (2) natural polymer (sodium alginate or chitosan) is associated with the MOFs source. In some embodiments, the MOFs source is selected from the group consisting of central atoms and organic framework.

In certain embodiments, the invention relates to a method of removing the quantity of a contaminant in water, comprising contacting the fluid with MOFs/natural polymers matrix, wherein the MOFs/natural polymers matrix comprises metal ions or clusters coordinated and natural polymers (sodium alginate and chitosan); and the contaminants are typical carbonylic compound-based pharmaceuticals.

In certain embodiments, the invention relates to a method of adsorbing a carbonylic compound-based pharmaceutical, comprising contacting the carbonylic compound with MOFs/natural polymers matrix.

DETAILED DESCRIPTION OF THE INVENTION

In certain embodiments, the present invention relates to materials and methods for adsorbing benzoic acid, ibuprofen and ketoprofen from water.

In certain embodiments, the invention relates to a method of capturing carbonylic compounds. In certain embodiments, the capturing occurs via physical or chemical adsorption or entrapping toxicant components of the selected Pharmaceuticals constituents.

In certain embodiments, the invention relates to a adsorbent to be used by wastewater treatment, wherein the adsorbent is capable of reducing the amount of contaminants in wastewater passing through the adsorbent.

In certain embodiments, the invention relates to a method of adsorbing contaminants from water. In certain embodiments, the method combines adsorption and desorption recycles of the wastewater treatment.

Overview

In certain embodiments, the invention relates to a metal-organic framework (MOF) matrix. In certain embodiments, the invention relates to any one of the aforementioned MOF matrices, wherein the MOF comprises metal ions or clusters coordinated to organic ligands. In certain embodiments, the invention relates to any one of the aforementioned MOF matrices, wherein the MOF matrix comprises metal ion or cluster coordinated to polydentate organic ligands.

In certain embodiments, the invention relates to any one of the aforementioned MOF matrices, wherein the MOF matrix comprises chitosan or MIL-101(Cr)/chitosan beads. MIL-101(Cr) is a chromium terephthalate-based mesoscopic metal-organic framework and one of the most porous materials reported to date.

The challenge solution and residual solution were analyzed by UV-vis spectrophotometry. The determination wavelengths were 224, 222 and 258 nm for benzoic acid, ibuprofen and ketoprofen, respectively. Adsorption data were collected in triplicate for the pH experiments and in duplicate for all other experiments. The adsorption capacity, $q_e$ (mg/g), was calculated according to equation 1.

$$q_e = \frac{(C_0 - C_e)V}{m} \tag{1}$$

where $C_0$ and $C_e$ (mg/L) are the initial and equilibrium contaminant concentrations in water, respectively; V (L) is the volume of solution; m (g) is the mass of dried adsorbents.

EXAMPLES

Figure 1:
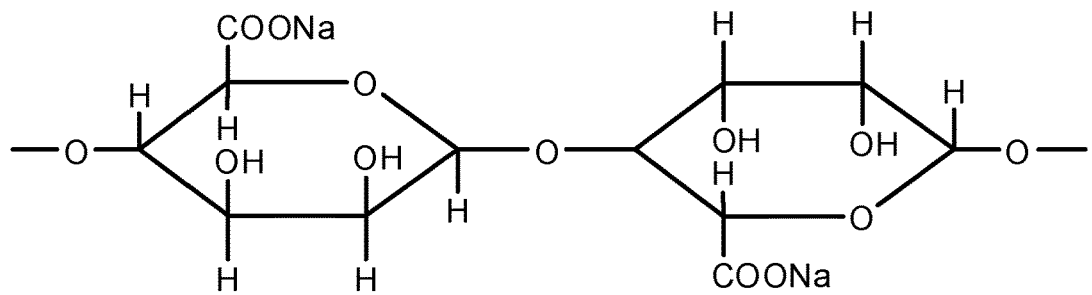
FIG. 1 is a schematic of sodium alginate and its components.

The invention is now further described by reference to the following examples which are intended to illustrate, not to limit the scope of the invention.

Example 1

MIL-101(Cr) Synthesis

Particles of metal-organic framework (MOF) MIL-101 (Cr) were synthesized hydrothermally. Typically, Cr $(NO_3)_3 \cdot 9H_2O$ (2.0 g), terephthalic acid (0.83 g), HF (0.5 mL) and deionized water (35 mL) were blended and briefly sonicated resulting in a dark blue-colored suspension. The suspension was placed in a Teflon-lined autoclave bomb (50 mL) and kept in an oven at 220° C. for 8 h without stirring. After the synthesis and equilibration at room temperature, the MIL-101(Cr) solids were separated from water using a centrifuge (8000 rpm, 10 min) and washed with water and ethanol. The suspension was centrifuged and separated, the solids were placed in DMF (20 mL) and the suspension was sonicated for 10 min and then kept at 70° C. overnight. The resulting solids were separated by centrifugation, repeatedly washed with ethanol, dried under vacuum at 75° C. for 2 days. Finally, MIL-101(Cr) nanopower were stored in a vacuum desiccator in the dark prior to further use.

Synthesis of MIL-101(Cr)/Sodium Alginate Hybrid Beads (MIL-101(Cr)/SA)

In one embodiment, 2.0 g of MIL-101(Cr) nanopowder was added to 100 mL pure water stirred for 5 min and completely dissolved. Then, the solution was treated in ultrasonic cleaner about 30 min and became homogeneous solution. The above hybrid aqueous solution was dropped into a $CaCl_2$-ethanol-water solution (2 wt. %, volume ratio=1:1) by using a syringe needle and then formed a few millimeters beads immediately. Subsequently, the beads in the solution were incubated for 30 min in the $CaCl_2$-ethanol-water solution at room temperature. The obtained beads were filtered and rinsed ten times by pure water to remove unreacted $Ca^{2+}$ on their surface. After that, the beads were obtained by suspending in cross-linking reaction medium containing 1.58M glutaraldehyde and 0.38M HCl at 40° C. for 24 h. Afterwards, the obtained beads were repeatedly filtered and washed by water until the pH of beads was until neutral. Finally, MIL-101(Cr)/sodium alginate beads were thus obtained and kept in water for further use.

Synthesis of MIL-101(Cr)/Chitosan Hybrid Beads (MIL-101(Cr)/CS)

In one embodiment, 2.0 g of MIL-101(Cr) nanopowder was added to 100 mL pure water stirred for 5 min and completely dissolved. Then, the solution was treated in ultrasonic cleaner about 30 min and became homogeneous solution. The above hybrid aqueous solution was dropped into a $Na_5P_3O_{10}$-ethanol-water solution (2 wt. %, volume ratio=1:1) by using a syringe needle and then formed a few millimeters beads immediately. Subsequently, the beads in the solution were incubated for 600 min in the $Na_5P_3O_{10}$-ethanol-water solution at room temperature. The obtained beads were filtered and rinsed ten times by pure water to remove unreacted $P_3O_{10}^{5-}$ on their surface. After that, the beads were obtained by suspending in cross-linking reaction medium containing 0.02M glutaraldehyde at 35° C. for 12 h. Afterwards, the obtained beads were repeatedly filtered and washed by water until the pH of beads was until neutral. Finally, MIL-101(Cr)/chitosan beads were thus obtained and kept in water for further use.

Synthesis of Sodium Alginate Beads (SA)

To prepare the sodium alginate beads, 2 wt. % sodium alginate were prepared by dissolving 2.0 g of sodium alginate powder into 100 mL pure water. The solution was stirred at 40° C. or 60 min to ensure complete dissolution of the sodium alginate. After dissolution, the solution was treated in ultrasonic cleaner about 30 min to remove little bubbles. The homogeneous sodium alginate solution was dropped into a $CaCl_2$-ethanol-water solution (2 wt. %, volume ratio of ethanol:water=1:1) by using a syringe needle and formed a few millimeters beads immediately. Subsequently, the beads in the solution were incubated for 30 min in the $CaCl_2$-ethanol-water solution at room temperature. The obtained beads were filtered and rinsed ten times by pure water to remove unreacted $Ca^{2+}$ on their surface. After that, the beads were obtained by suspending in cross-linking reaction medium containing 1.58 M glutaraldehyde and 0.38 M HCl at 40° C. for 24 h. Afterwards, the obtained beads were repeatedly filtered and washed by water until the pH of beads was until neutral. Finally, sodium alginate beads were thus obtained and kept in water for further use.

Synthesis of Chitosan Beads (CS)

To prepare the chitosan beads, 2 wt. % chitosan was prepared by dissolving 2.0 g of chitosan powder into 1 wt. % acetic acid solution about 100 mL. The solution was stirred f at room temperature or 60 min to ensure complete dissolution of the chitosan. After dissolution, the solution was treated in ultrasonic cleaner about 30 min to remove little bubbles. The homogeneous chitosan solution was dropped into a $Na_5P_3O_{10}$-ethanol-water solution (2 wt. %, volume ratio=1:1) by using a syringe needle and formed a few millimeters beads immediately. Subsequently, the beads in the solution were incubated for 12 h in the $Na_5P_3O_{10}$-ethanol-water solution at room temperature. The obtained beads were filtered and rinsed ten times by pure water to remove unreacted $P_3O_{10}^{5-}$ on their surface. After that, the beads were obtained by suspending in cross-linking reaction medium containing 0.02 M glutaraldehyde at 35° C. for 12 h. Afterwards, the obtained beads were repeatedly filtered and washed by water until the pH of beads was until neutral. Finally, chitosan beads were thus obtained and kept in water for further use.

Fourier Transform Infra-Red Study

FTIR spectra of the obtained raw MIL-101(Cr) nanopowder and SA, CS, MIL-101(Cr)/SA and MIL-101(Cr)/CS beads were studied by using Fourier transform infrared spectra (Nicolet 170 IR spectrometer). For the Fourier transform infrared spectra characterization, the KBr discs of the samples were prepared by mixing and grounding the samples with KBr powder in mortar with pestle. The mixture was then shaped into discs under mechanical pressure. The samples discs were put into Fourier transform infrared spectra and spectral measurements were recorded in the wavenumber range of 450-1850 $cm^{-1}$. Prior to the above measurement, the samples were vacuum-dried at 60° C. for 24 h.

Adsorption Study

For three selected pharmaceuticals, stock solutions of benzoic acid, ibuprofen and ketoprofen were prepared in pure ethanol at a concentration of 2.5 g $L^{-1}$ and stored in a refrigerator (<0° C.) until used. Adsorption experiments were conducted in a series of 150 mL conical flasks, with a known initial concentration ($C_0$) of three pharmaceuticals aqueous solution and a designed amount of adsorbent. The maximum adsorbent capacities were determined by various initial concentrations of the solutions, which were 20, 30, 40, 50, 60, 70 and 80 mg $L^{-1}$. Flasks were sealed and placed in a New Brunswick G-25 incubator shaker with a shaking speed of 140 rpm. Kinetics experiments were carried out to determine the time for equilibrium and the initial concentrations ($C_0$) of the solutions were 50 mg $L^{-1}$. The concentrations before and after adsorption were analyzed by UV-vis spectrophotometry. The determination wavelengths were 224, 222 and 258 nm for benzoic acid, ibuprofen and ketoprofen, respectively. The adsorption capacity, $q_e$ (mg/g), was calculated according to equation 1.

$$q_e = \frac{(C_0 - C_e)V}{m} \quad (1)$$

where $C_0$ and $C_e$ (mg/L) are the initial and equilibrium contaminant concentrations in water, respectively; V (L) is the volume of solution; m (g) is the mass of dried adsorbents.

Results and Discussion

Fourier Transform Infra-Red Spectra

Figure 5:
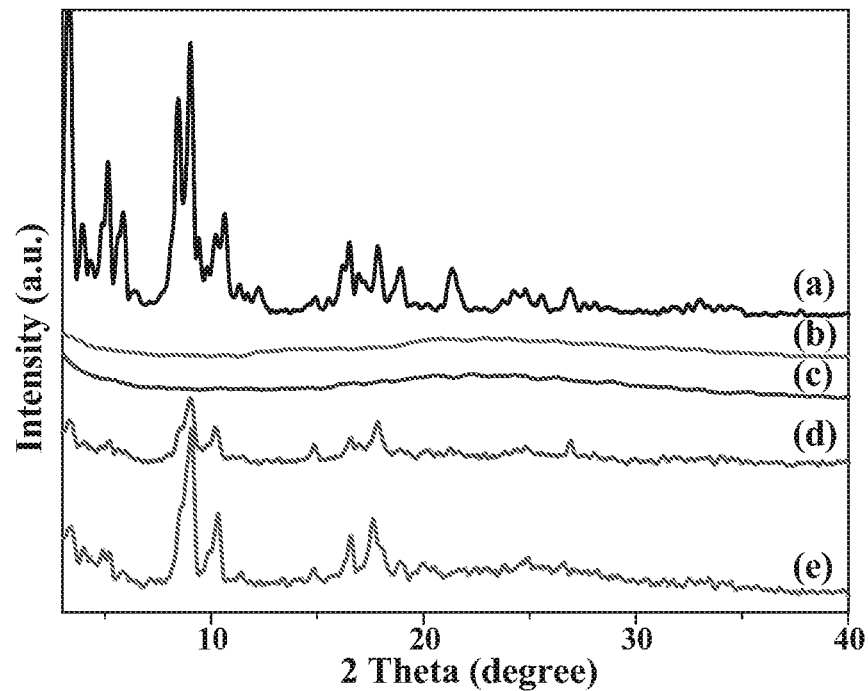
FIG. 5 depicts typical X-ray diffraction (XRD) for MIL-101(Cr) and MIL-101(Cr)/CS hybrid material at a voltage of 40 kV and a current of 30 mA using Cu Kα radiation.
Figure 6:
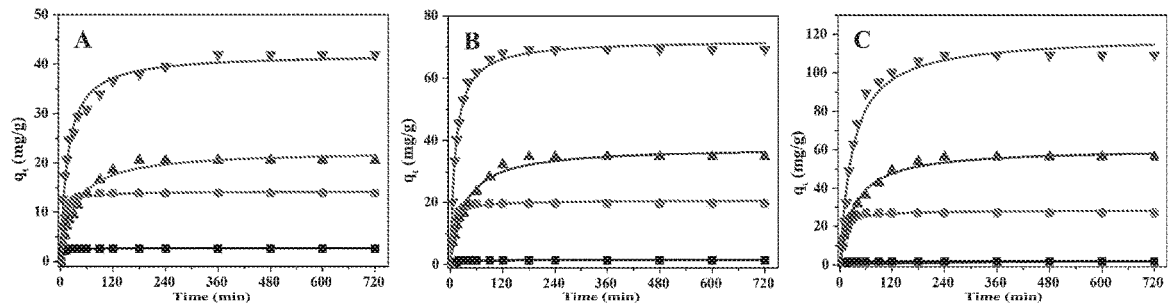
FIG. 6 depicts results for adsorbing capacities of the benzoic acid, ibuprofen and ketoprofen from water by sodium alginate, chitosan, MIL-101(Cr)/sodium alginate and MIL-101(Cr)/chitosan beads with the time changing.

In FIG. 5, the FTIR spectra of the raw MIL-101(Cr), sharp peaks with high intensity in the range of 1500-1650 $cm^{-1}$ indicate the stretching vibrations of C=C bound of aromatic rings. Strong bands at 1401 and 744 $cm^{-1}$ correspond to —$COO^-$ vibration and C—H vibration of aromatic rings, respectively. The peak with medium strength in 589 $cm^{-1}$ is due to Cr—O vibrations, which proves the formation of metal organic framework indeed. Similarly, in the FTIR spectrum of MIL-101(Cr)/SA and MIL-101(Cr)/CS, the same functional groups above mentioned are found around the corresponding 1624, 1554, 1507, 1401, 744 and 589 $cm^{-1}$. Therefore, it is concluded that MIL-101(Cr) has been successfully incorporated to the composite beads.

Adsorption Study

A number of papers have been published on the performance of processed and functionalized MOFs for the removal organic compounds. However, poor separability restricts their practical application. In the present invention, both MOFs based on natural polymers MOFs/sodium alginate (MOFs/SA) and MOFs/chitosan (MOFs/CS) composite beads were prepared and characterized. Adsorption of three selected pharmaceuticals (benzoic acid (BEN), ibuprofen (IBU) and ketoprofen (KET)) onto the two composite beads were investigated and compared with raw SA and CS beads.

Adsorption Kinetics

Figure 7:
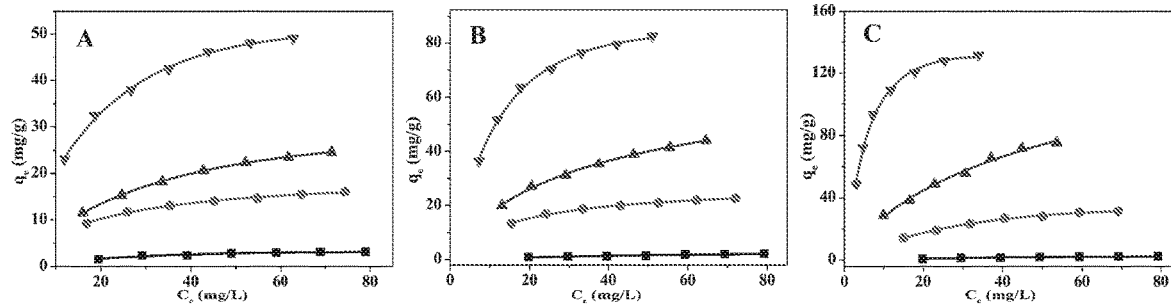
FIG. 7 depicts results for adsorbing capacities of the benzoic acid, ibuprofen and ketoprofen from water by sodium alginate, chitosan, MIL-101(Cr)/sodium alginate and MIL-101(Cr)/chitosan beads with the initial various concentration contaminants.

In FIG. 7, all adsorption amounts of adsorbents follow the order of MIL-101(Cr)/CS>MIL-101(Cr)/SA>CS>SA to three selected pharmaceuticals, suggesting that the presence of MIL-101(Cr) plays a significant role in improving the interactions between the adsorbates and the composite beads. In general, adsorption amounts onto the composite beads increase quickly in the first 60 min of contact time with about 70%-80% equilibria adsorption amounts and then achieve the adsorption equilibrium after 180 min. The greater adsorption amounts and higher adsorption rates indicate that MIL-101(Cr)/CS beads possess the competitive advantage for the pharmaceuticals removal.

To evaluate the kinetic adsorption mechanism, three adsorption kinetics models, namely the pseudo-first-order, the pseudo-second-order, and the intra-particle diffusion models were selected to fit the dynamic data.

The pseudo-first order model assumes that the sorption rate decreases linearly with the increase of adsorption capacity. The pseudo-first order model is given as $$q_t = q_e(1 - e^{-k_1 t})$$

where $q_e$ and $q_t$ (mg/g) are the amounts of the contaminant onto the adsorbents at equilibrium and at time t (min). $k_1$ ($min^{-1}$) is the rate constant in the pseudo-first order adsorption model.

The pseudo-second order kinetic model assumes that the rate-limiting step is the interaction between two reagent particles. It is usually used to describe a chemical adsorption. Its linear form is $$q_t = \frac{k_2 q_e^2 t}{1 + k_2 q_e t}$$

where $k_2$ (g/(mg·min)) is the rate constant in pseudo-second order adsorption model.

The data in Table 1 show that pseudo-second-order kinetic model ($R^2 > 0.98$) could fit the adsorption data well onto the CS, MIL-101(Cr)/SA and MIL-101(Cr)/CS. As is known, the pseudo-second-order model is commonly related to the chemical adsorption process and the number of active sites on the sorbent determines the adsorption capacity. The high correlation coefficients ($R^2$) imply there possibly exist chemical interactions between pharmaceuticals and the adsorbents. Given that the three pharmaceuticals partially exist in their anionic forms at initial pH of 4.08, 4.27, and 4.23 respectively, the protonated amine cationic sites on the chitosan and MIL-101(Cr) can capture three pharmaceuticals anion by electrostatic attraction. The fast kinetics indicates that MIL-101(Cr)/SA and MIL-101(Cr)/CS can enlarge the application of MOFs on the removal of carboxylic contaminants from waters.

constant demonstrating the tendency of adsorption. As depicted in Table 2, increased maximum adsorption capacities were observed for MIL-101(Cr) based on chitosan beads ($q_{max}$) for benzoic acid, 103.2 for ibuprofen and 156.5 for ketoprofen). This increased might be related to the present MIL-101(Cr) and indicate that MIL-101(Cr)/SA and MIL-101(Cr)/CS can enlarge the application of MOFs on the removal of carboxylic contaminants from waters.

TABLE 2

Parameters of Isotherm Models.

| Adsorbent | Adsorbate | Langmuir Model | | |
|---|---|---|---|---|
| | | $K_L$ | $q_{max}$ | $R^2$ |
| BEN | SA | 0.0314 | 4.5 | 0.938 |
| | CS | 0.0521 | 20.1 | 0.995 |
| | MIL-101(Cr)@SA | 0.0296 | 36.5 | 0.998 |
| | MIL-101(Cr)@CS | 0.0488 | 66.5 | 0.989 |
| BEN | SA | 0.00983 | 4.8 | 0.942 |
| | CS | 0.0612 | 27.7 | 0.996 |
| | MIL-101(Cr)@SA | 0.0356 | 62.6 | 0.996 |
| | MIL-101(Cr)@CS | 0.0829 | 103.2 | 0.991 |
| KET | SA | 0.0119 | 5.1 | 0.913 |
| | CS | 0.0298 | 47.4 | 0.990 |
| | MIL-101(Cr)@SA | 0.0261 | 130.6 | 0.991 |
| | MIL-101(Cr)@CS | 0.180 | 156.5 | 0.985 |

TABLE 1

Parameters of Kinetic Models.

| Adsorbent | Adsorbate | Pseudo first-order model | | | Pseudo second-order model | | |
|---|---|---|---|---|---|---|---|
| | | $k_1/10^{-1}$ | $Q_e$ | $R^2$ | $k_2/10^{-2}$ | $Q_e$ | $R^2$ |
| Benzoic acid | SA | 2.785 | 2.6 | 0.973 | 26.04 | 2.7 | 0.988 |
| | CS | 1.101 | 13.7 | 0.984 | 1.407 | 14.3 | 0.994 |
| | MIL-101(Cr)@SA | 0.222 | 20.3 | 0.985 | 0.133 | 22.4 | 0.990 |
| | MIL-101(Cr)@CS | 0.445 | 38.9 | 0.930 | 0.151 | 42.1 | 0.986 |
| Ibuprofen | SA | 0.798 | 1.4 | 0.952 | 8.927 | 1.4 | 0.892 |
| | CS | 0.932 | 19.7 | 0.969 | 0.785 | 20.6 | 0.996 |
| | MIL-101(Cr)@SA | 0.232 | 34.5 | 0.981 | 0.084 | 37.9 | 0.986 |
| | MIL-101(Cr)@CS | 0.577 | 68.0 | 0.990 | 0.123 | 72.3 | 0.995 |
| Ketoprofen | SA | 1.103 | 1.9 | 0.982 | 10.113 | 1.9 | 0.926 |
| | CS | 0.783 | 27.0 | 0.988 | 0.460 | 28.3 | 0.997 |
| | MIL-101(Cr)@SA | 0.223 | 55.3 | 0.971 | 0.050 | 60.8 | 0.989 |
| | MIL-101(Cr)@CS | 0.273 | 108.2 | 0.995 | 0.030 | 119.2 | 0.980 |

Adsorption Isotherms

Figure 8:
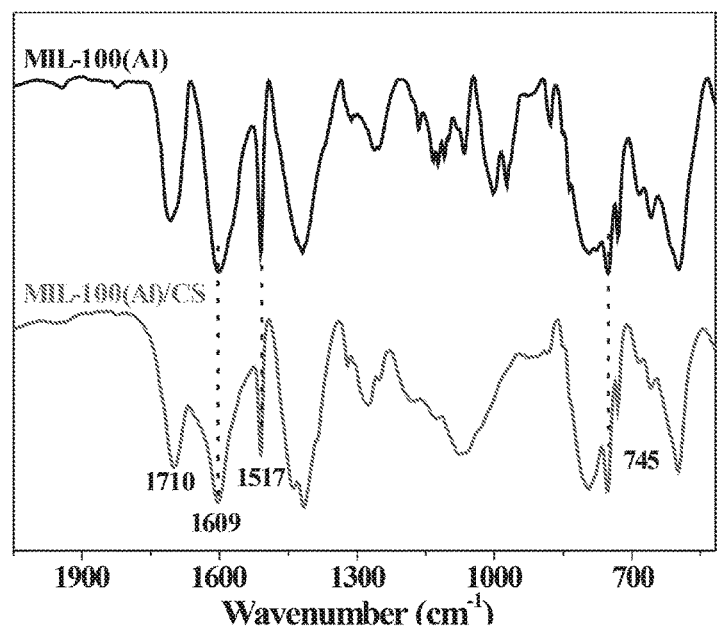
FIG. 8 depicts typical FTIR (Fourier transform infrared Spectrum) for raw MIL-100(Al), MIL-100(Al)/sodium alginate hybrid material within a wave number range of 450-2050 cm$^{-1}$.

Adsorption isotherms of the three pharmaceuticals onto the four adsorbents were depicted in FIG. 8, The adsorption of three selected pharmaceuticals increased rapidly with increase in the initial concentration especial MIL-101(Cr)/SA and MIL-101(Cr)/CS, however further increase in the initial concentration led to a gradual decrease in the adsorption. The initial increase might be due to the increased surface area and binding sites. The adsorption equilibrium data three pharmaceuticals were analyzed with the following Langmuir Model equation $$q_e = \frac{q_{max} K_L C_e}{1 + K_L C_e}$$

where $q_e$ (mg/g) is the adsorption capacity, $C_e$ (mg/L) is the equilibrium contaminant concentrations in water, $q_{max}$ (mg/g) is the theoretical saturate adsorption capacity in the Langmuir model, and $K_L$ (L/mg) is the Langmuir isotherm Example 2

MIL-100(Al) Synthesis

Particles of metal-organic framework (MOF) MIL-100 (Al) were synthesized hydrothermally. Typically, Al $(NO_3)_3 \cdot 9H_2O$ (4.2 g), trimesic acid (2.0 g) and nitric acid (62 mL, 20 wt. %) were blended and briefly sonicated resulting in a dark blue-colored suspension. The suspension was placed in a Teflon-lined autoclave bomb (100 mL) and kept in an oven at 210° C. for 3 h without stirring. After the synthesis and equilibration at room temperature, the MIL-100(Al) solids were separated from water using a centrifuge (8000 rpm, 10 min). The resulting solids were washed with DMF and separated by centrifugation, repeatedly washed with EtOH, dried under vacuum at 80° C. for 2 days. Finally, MIL-100(Al) nanopower were stored in a vacuum desiccator in the dark prior to further use.

Synthesis of MIL-100(Al)/Sodium Alginate Hybrid Beads (MIL-100(Al)/SA)

In one embodiment, 2.0 g of MIL-100(Al) nanopowder was added to 100 mL pure water stirred for 5 min and completely dissolved. Then, the solution was treated in ultrasonic cleaner about 30 min and became homogeneous solution. The above hybrid aqueous solution was dropped into a CaCl$_2$-ethanol-water solution (2 wt. %, volume ratio=1:1) by using a syringe needle and then formed a few millimeters beads immediately. Subsequently, the beads in the solution were incubated for 30 min in the CaCl$_2$-ethanol-water solution at room temperature. The obtained beads were filtered and rinsed ten times by pure water to remove unreacted Ca$^{2+}$ on their surface. After that, the beads were obtained by suspending in cross-linking reaction medium containing 1.58M glutaraldehyde and 0.38M HCl at 40° C. for 24 h. Afterwards, the obtained beads were repeatedly filtered and washed by water until the pH of beads was until neutral. Finally, MIL-100(Al)/sodium alginate beads (MIL-100(Al)/SA) were thus obtained and kept in water for further use.

UIO-66 Synthesis

Particles of metal-organic framework (MOF) UIO-66 were synthesized hydrothermally. Typically, ZrCl$_4$ (2.05 g), terephthalic acid (1.31 g) and DMF (100 mL) were blended and briefly sonicated resulting in a white suspension. The suspension was placed in a Teflon-lined autoclave bomb (200 mL) and kept in an oven at 120° C. for 24 h without stirring. After the synthesis and equilibration at room temperature, the UIO-66 solids were separated from water using a centrifuge (8000 rpm, 10 min) and washed with DMF. The suspension was centrifuged and separated, the solids were placed in DMF (200 mL) and the suspension was sonicated for 10 min and then kept at 70° C. overnight. The resulting solids were separated by centrifugation, repeatedly washed with ethanol, dried under vacuum at 80° C. for 2 days. Finally, UIO-66 nanopower were stored in a vacuum desiccator in the dark prior to further use.

Synthesis of UIO-66/Chitosan Hybrid Beads (UIO-66/CS)

In one embodiment, 2.0 g of UIO-66 nanopowder was added to 100 mL pure water stirred for 5 min and completely dissolved. Then, the solution was treated in ultrasonic cleaner about 30 min and became homogeneous solution. The above hybrid aqueous solution was dropped into a Na$_5$P$_3$O$_{10}$-ethanol-water solution (2 wt. %, volume ratio=1:1) by using a syringe needle and then formed a few millimeters beads immediately. Subsequently, the beads in the solution were incubated for 600 min in the Na$_5$P$_3$O$_{10}$-ethanol-water solution at room temperature. The obtained beads were filtered and rinsed ten times by pure water to remove unreacted P$_3$O$_{10}^{5-}$ on their surface. After that, the beads were obtained by suspending in cross-linking reaction medium containing 0.02M glutaraldehyde at 35° C. for 12 h. Afterwards, the obtained beads were repeatedly filtered and washed by water until the pH of beads was until neutral. Finally, UIO-66/chitosan beads (UIO-66/CS) were thus obtained and kept in water for further use.

MIL-53(Al) Synthesis

Particles of metal-organic framework (MOF) MIL-53 (Al) were synthesized hydrothermally. Typically, Al(NO$_3$)$_3$.9H$_2$O (6.5 g), terephthalic acid (1.44 g) and deionized water (25 mL) were blended and briefly sonicated resulting in a dark blue-colored suspension. The suspension was placed in a Teflon-lined autoclave bomb (50 mL) and kept in an oven at 220° C. for 72 h without stirring. After the synthesis and equilibration at room temperature, the MIL-101(Cr) solids were separated from water using a centrifuge (8000 rpm, 10 min) and washed with MIL-53(Al). The suspension was centrifuged and separated, the solids were placed in the muffle furnace and then kept at 330° C. for 72 h. The resulting solids were washed with DMF and separated by centrifugation, repeatedly washed with DMF, dried under vacuum at 150° C. for 2 days. Finally, MIL-53(Al) nanopower were stored in a vacuum desiccator in the dark prior to further use.

Synthesis of MIL-53(Al)/Chitosan Hybrid Beads (MIL-53(Al)/CS)

In one embodiment, 2.0 g of MIL-53(Al) nanopowder was added to 100 mL pure water stirred for 5 min and completely dissolved. Then, the solution was treated in ultrasonic cleaner about 30 min and became homogeneous solution. The above hybrid aqueous solution was dropped into a Na$_5$P$_3$O$_{10}$-ethanol-water solution (2 wt. %, volume ratio=1:1) by using a syringe needle and then formed a few millimeters beads immediately. Subsequently, the beads in the solution were incubated for 600 min in the Na$_5$P$_3$O$_{10}$-ethanol-water solution at room temperature. The obtained beads were filtered and rinsed ten times by pure water to remove unreacted P$_3$O$_{10}^{5-}$ on their surface. After that, the beads were obtained by suspending in cross-linking reaction medium containing 0.02M glutaraldehyde at 35° C. for 12 h. Afterwards, the obtained beads were repeatedly filtered and washed by water until the pH of beads was until neutral. Finally, MIL-53(Al)/chitosan beads (MIL-53(Al)/CS) were thus obtained and kept in water for further use.

ZIF-8 Synthesis

Particles of zeolitic imidazolate frameworks (ZIFs), ZIF-8, were synthesized at room temperature. Typically, Zn(NO$_3$)$_3$ (0.15 g) and CH$_3$OH (34 mL) were blended and briefly sonicated for 5 min and 2-methylimidazole (0.13 g) and CH$_3$OH (34 mL) were blended and briefly sonicated for 5 min. The above solutions are mixed uniformity and then sit for 24 h at room temperature. After the synthesis and equilibration, the ZIF-8 solids were separated from water using a centrifuge (8000 rpm, 10 min) and washed with CH$_3$OH. The suspension was centrifuged and separated, the solids were placed in CH$_3$OH (200 mL) and the suspension was sonicated for 10 min and then kept at 70° C. overnight. The resulting solids were separated by centrifugation, repeatedly washed with ethanol, dried under vacuum at 80° C. for 2 days. Finally, ZIF-8 nanopower were stored in a vacuum desiccator in the dark prior to further use.

Synthesis of ZIF-8/Chitosan Hybrid Beads (ZIF-8/CS)

In one embodiment, 2.0 g of ZIF-8 nanopowder was added to 100 mL pure water stirred for 5 min and completely dissolved. Then, the solution was treated in ultrasonic cleaner about 30 min and became homogeneous solution. The above hybrid aqueous solution was dropped into a Na$_5$P$_3$O$_{10}$-ethanol-water solution (2 wt. %, volume ratio=1:1) by using a syringe needle and then formed a few millimeters beads immediately. Subsequently, the beads in the solution were incubated for 600 min in the Na$_5$P$_3$O$_{10}$-ethanol-water solution at room temperature. The obtained beads were filtered and rinsed ten times by pure water to remove unreacted P$_3$O$_{10}^{5-}$ on their surface. After that, the beads were obtained by suspending in cross-linking reaction medium containing 0.02M glutaraldehyde at 35° C. for 12 h. Afterwards, the obtained beads were repeatedly filtered and washed by water until the pH of beads was until neutral. Finally, ZIF-8/chitosan beads (ZIF-8/CS) were thus obtained and kept in water for further use.

ZIF-67 Synthesis

Particles of zeolitic imidazolate frameworks (ZIFs), ZIF-67, were synthesized at room temperature. Typically, Co(NO$_3$)$_3$.6H$_2$O (0.1 g), 2-methylimidazole (1.22 g) and H$_2$O (5.1 mL) were blended and briefly sonicated for 5 min. The above solutions are mixed uniformity and then sit for 24 h at 30° C. for 6 h. After the synthesis and equilibration, the ZIF-67 solids were separated from water using a centrifuge (67000 rpm, 10 min) and washed with $CH_3OH$. The suspension was centrifuged and separated, the solids were placed in $CH_3OH$ (200 mL) and the suspension was sonicated for 10 min and then kept at 30° C. overnight. The resulting solids were separated by centrifugation, repeatedly washed with ethanol, dried under vacuum at 70° C. for 2 days. Finally, ZIF-67 nanopower were stored in a vacuum desiccator in the dark prior to further use.

Synthesis of ZIF-67/Chitosan Hybrid Beads (ZIF-67/CS)

In one embodiment, 2.0 g of ZIF-67 nanopowder was added to 100 mL pure water stirred for 5 min and completely dissolved. Then, the solution was treated in ultrasonic cleaner about 30 min and became homogeneous solution. The above hybrid aqueous solution was dropped into a $Na_5P_3O_{10}$-ethanol-water solution (2 wt. %, volume ratio=1:1) by using a syringe needle and then formed a few millimeters beads immediately. Subsequently, the beads in the solution were incubated for 600 min in the $Na_5P_3O_{10}$-ethanol-water solution at room temperature. The obtained beads were filtered and rinsed ten times by pure water to remove unreacted $P_3O_{10}^{5-}$ on their surface. After that, the beads were obtained by suspending in cross-linking reaction medium containing 0.02M glutaraldehyde at 35° C. for 12 h. Afterwards, the obtained beads were repeatedly filtered and washed by water until the pH of beads was until neutral. Finally, ZIF-67/chitosan beads (ZIF-67/CS) were thus obtained and kept in water for further use.

Fourier Transform Infra-Red Study

IR spectra of the obtained raw MOFs nanopowders and the synthesized beads were studied by using Fourier transform infrared spectra (Nicolet 170 IR spectrometer). For the Fourier transform infrared spectra characterization, the KBr discs of the samples were prepared by mixing and grounding the samples with KBr powder in mortar with pestle. The mixture was then shaped into discs under mechanical pressure. The samples discs were put into Fourier transform infrared spectra and spectral measurements were recorded. Prior to the above measurement, the samples were vacuum-dried at 60° C. for 24 h.

Adsorption Study

For selected pharmaceuticals, stock solutions of benzoic acid was prepared in pure ethanol at a concentration of 2.5 g $L^{-1}$ and stored in a refrigerator (<0° C.) until used. Adsorption experiments were conducted in a series of 150 mL conical flasks, with an initial concentration ($C_0$) of pharmaceutic aqueous solution (100 mg/L), a designed amount of adsorbent, and a pre-adjusted pH by using dilute HCl or NaOH solution. Flasks were sealed and placed in a New Brunswick G-25 incubator shaker with a shaking speed of 140 rpm. The determination wavelengths were 224 nm. The adsorption capacity, $q_e$ (mg/g), was calculated according to equation 1 as aforementioned.

Results and Discussion

Fourier Transform Infra Red

In FIG. 8, the FTIR spectra of the raw MIL-100(Al), sharp peaks with high intensity in the range of 1500-1650 $cm^{-1}$ indicate the stretching vibrations of C=C bound of aromatic rings. Strong bands at 745 $cm^{-1}$ correspond to C—H vibration of aromatic rings, respectively. Similarly, in the FTIR spectrum of MIL-100(Al)/CS, the same functional groups above mentioned are found around the corresponding 1710, 1609, 1517 and 745 $cm^{-1}$. Therefore, it is concluded that MIL-100(Al) has been successfully incorporated to the composite beads.

Figure 9:
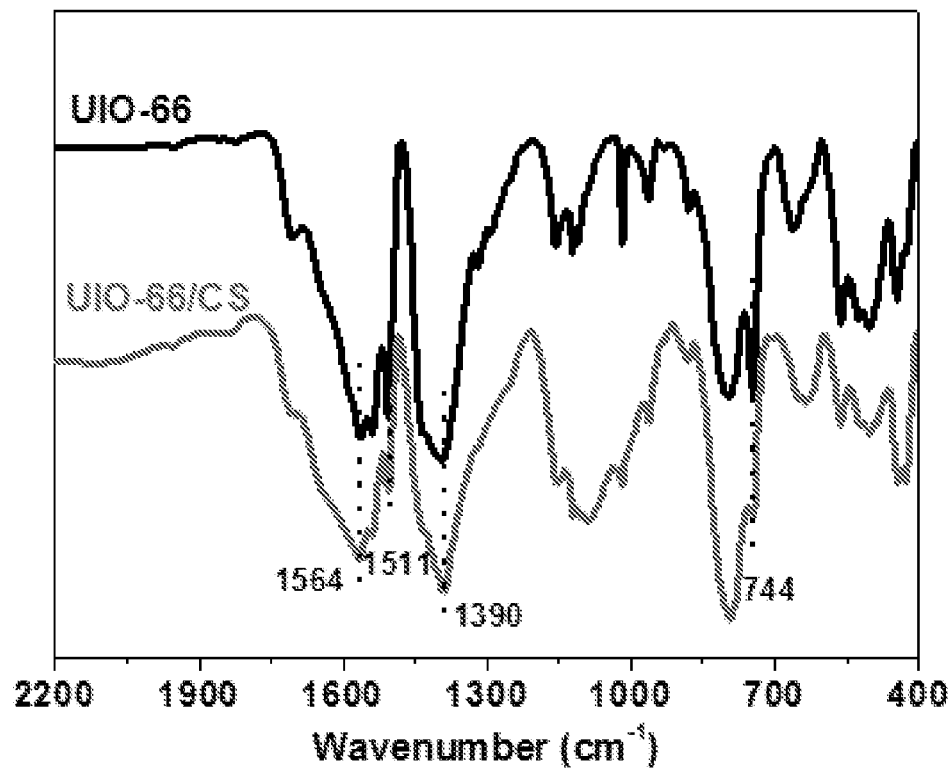
FIG. 9 depicts typical FTIR (Fourier transform infrared Spectrum) for raw UIO-66, and UIO-66/chitosan hybrid beads within a wave number range of 400-2200 cm$^{-1}$.

In FIG. 9, the FTIR spectra of the raw UIO-66, sharp peaks with high intensity in the range of 1500-1650 $cm^{-1}$ indicate the stretching vibrations of C=C bound of aromatic rings. Strong bands at 1390 and 744 $cm^{-1}$ correspond to —$COO^-$ vibration and C—H vibration of aromatic rings, respectively. Similarly, in the FTIR spectrum of MIL-53 (Al)/CS, the same functional groups above mentioned are found around the corresponding 1564, 1511, 1390 and 744 $cm^{-1}$. Therefore, it is concluded that UIO-66 has been successfully incorporated to the composite beads.

Figure 10:
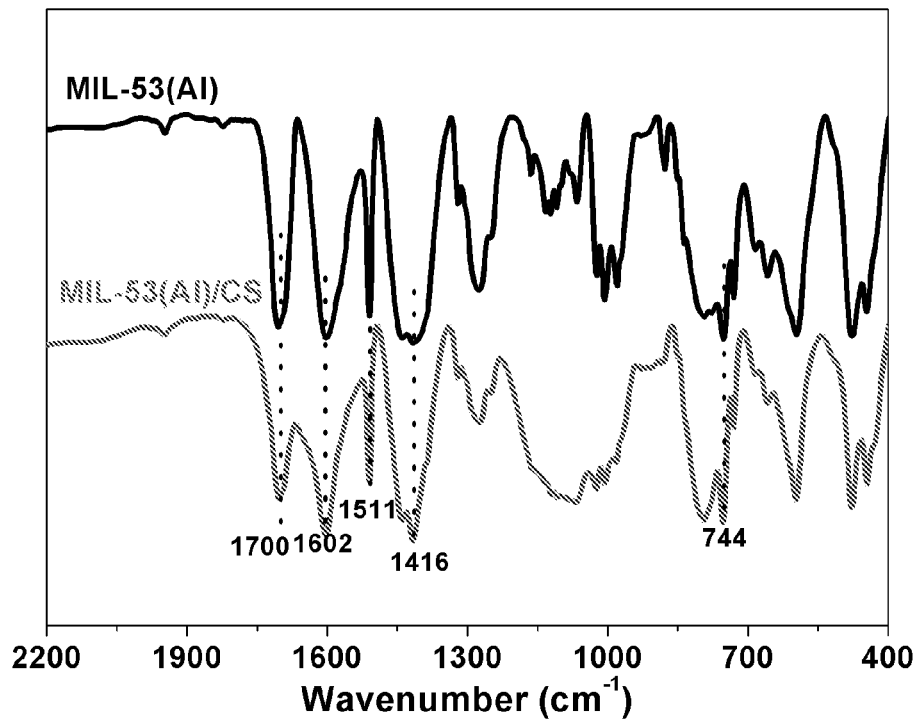
FIG. 10 depicts typical FTIR (Fourier transform infrared Spectrum) for raw MIL-53(Al), and MIL-53(Al)/chitosan hybrid beads within a wave number range of 400-2200 cm$^{-1}$.

In FIG. 10, the FTIR spectra of the raw MIL-53(Al), sharp peaks with high intensity in the range of 1500-1650 $cm^{-1}$ indicate the stretching vibrations of C=C bound of aromatic rings. Strong bands at 1416 and 744 $cm^{-1}$ correspond to —$COO^-$ vibration and C—H vibration of aromatic rings, respectively. Similarly, in the FTIR spectrum of MIL-53 (Al)/CS, the same functional groups above mentioned are found around the corresponding 1700, 1602, 1511, 1416 and 744 $cm^{-1}$. Therefore, it is concluded that MIL-53(Al) has been successfully incorporated to the composite beads.

Figure 11:
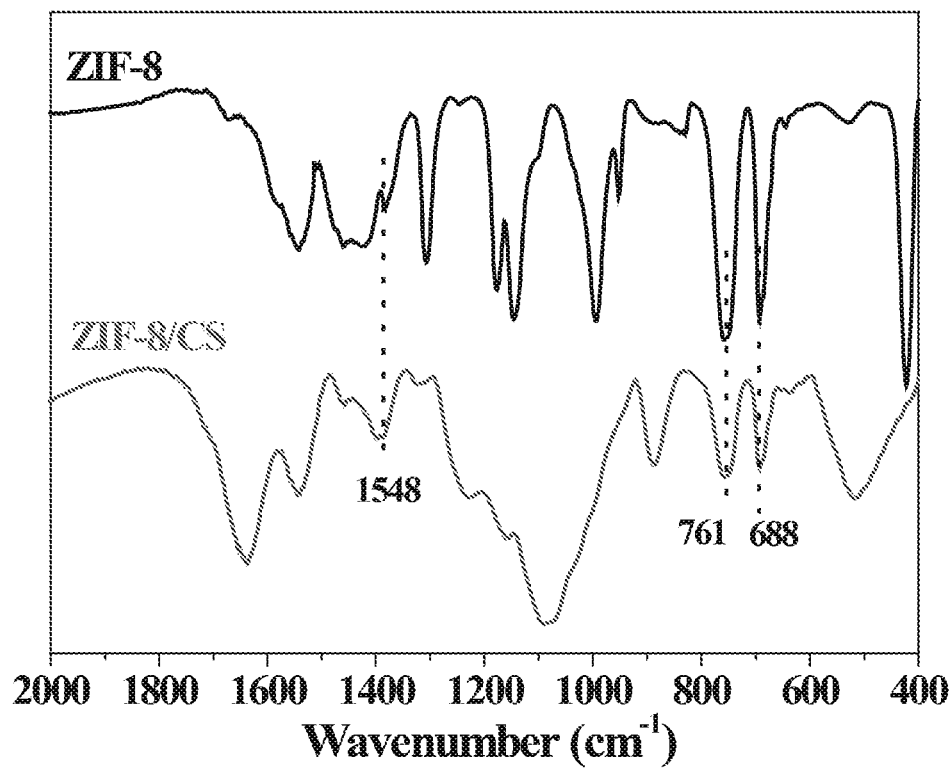
FIG. 11 depicts typical FTIR (Fourier transform infrared Spectrum) for raw ZIF-8, and ZIF-8/chitosan hybrid beads within a wave number range of 400-2000 cm$^{-1}$.

In FIG. 11, the FTIR spectra of the raw ZIF-8, strong bands at 1548, 761 and 668 $cm^{-1}$ correspond to —C=N vibration and C—N vibration of imidazole rings, respectively. Similarly, in the FTIR spectrum of ZIF-8/CS, the same functional groups above mentioned are found around the corresponding 1548, 761 and 667 $cm^{-1}$. Therefore, it is concluded that ZIF-8 has been successfully incorporated to the composite beads.

Figure 12:
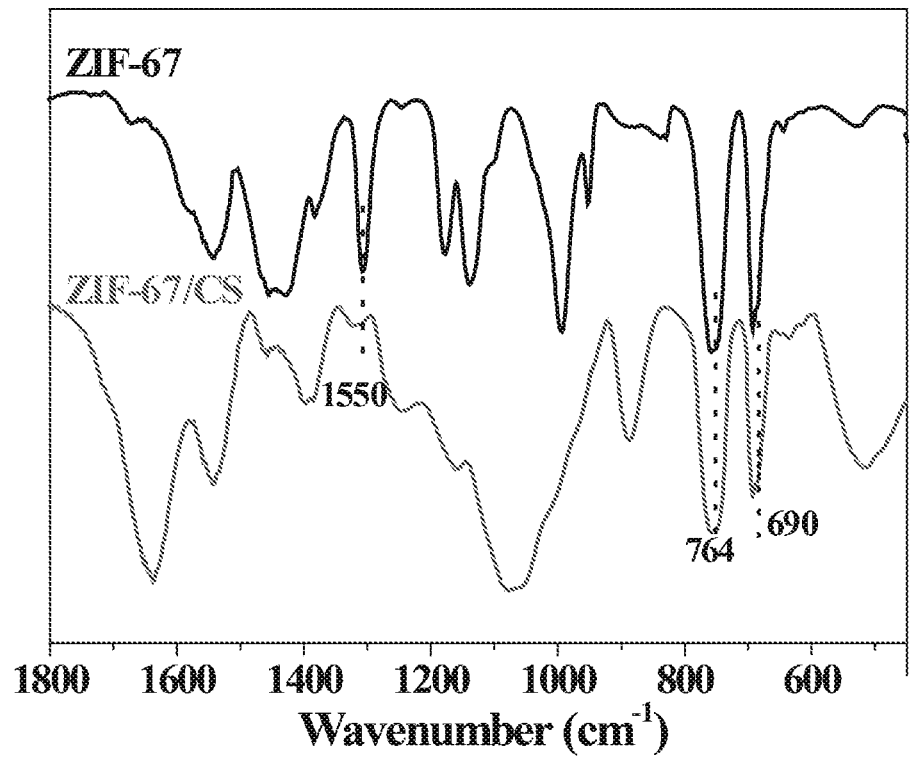
FIG. 12 depicts typical FTIR (Fourier transform infrared Spectrum) for raw ZIF-67, and ZIF-67/chitosan hybrid beads within a wave number range of 450-1800 cm$^{-1}$.

In FIG. 12, the FTIR spectra of the raw ZIF-67, strong bands at 1550, 764 and 690 $cm^{-1}$ correspond to —C=N vibration and C—N vibration of imidazole rings, respectively. Similarly, in the FTIR spectrum of ZIF-67/CS, the same functional groups above mentioned are found around the corresponding 1550, 764 and 690 $cm^{-1}$. Therefore, it is concluded that ZIF-8 has been successfully incorporated to the composite beads.

Adsorption Study

Figure 2:
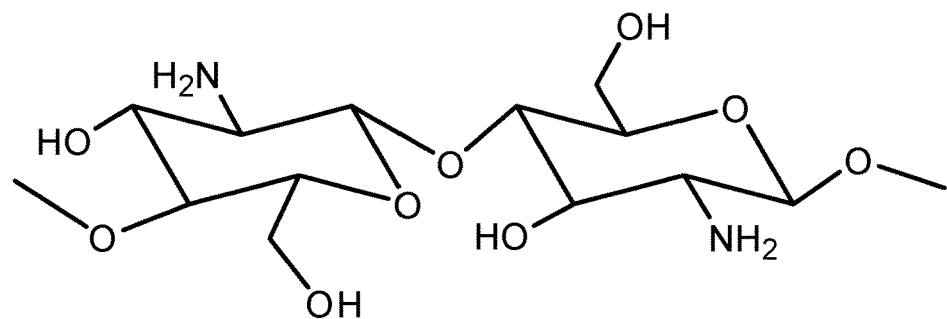
FIG. 2 is a schematic of chitosan and its components.
Figure 3:
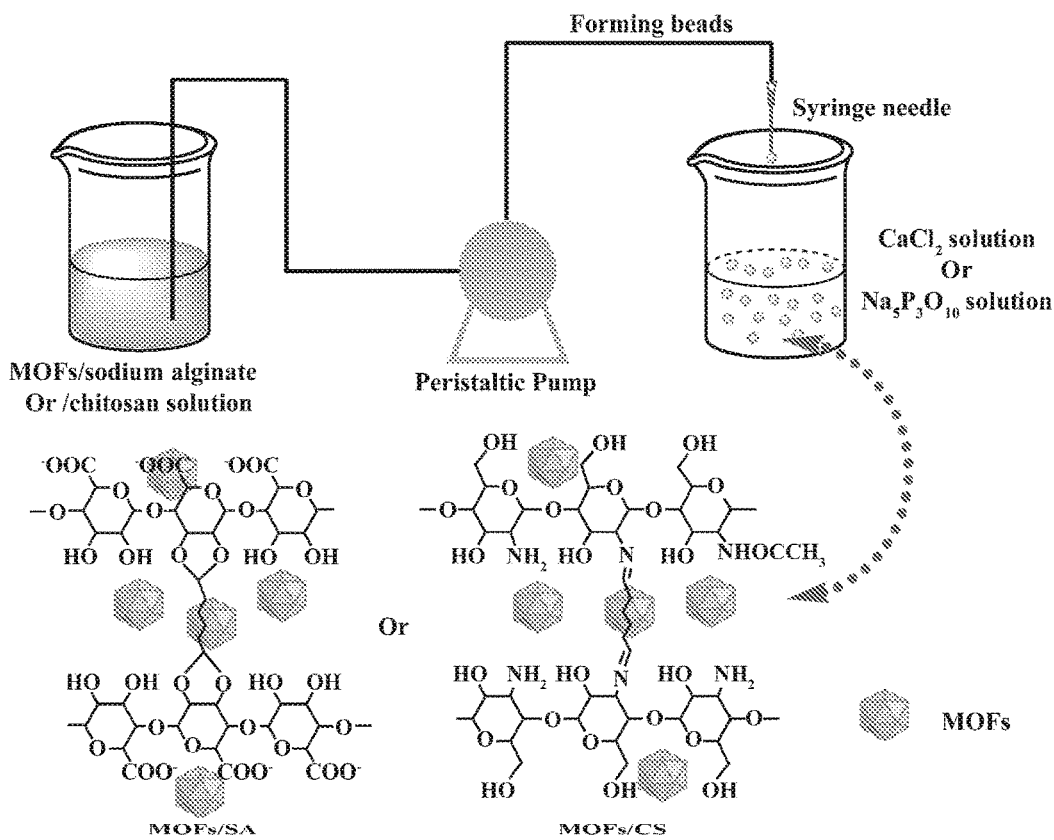
FIG. 3 is prior art for synthesizing a MIL-101(Cr) composited with sodium alginate and chitosan based beads.
Figure 4:
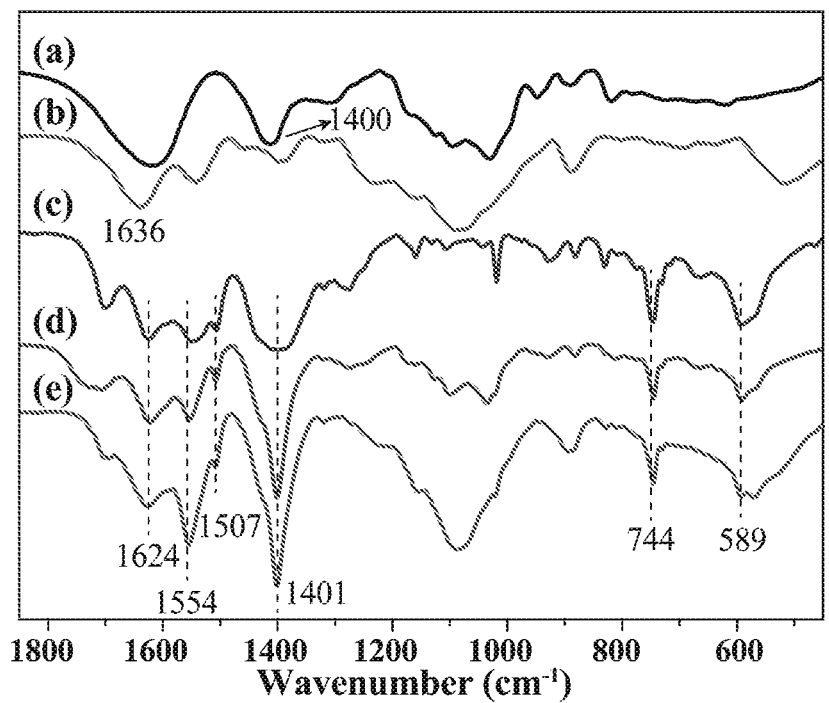
FIG. 4 depicts typical FTIR (Fourier transform infrared Spectrum) for sodium alginate, chitosan, raw MIL-101(Cr), MIL-101(Cr)/sodium alginate and MIL-101(Cr)/chitosan hybrid material within a wave number range of 450-1850 cm$^{-1}$.
Figure 13:
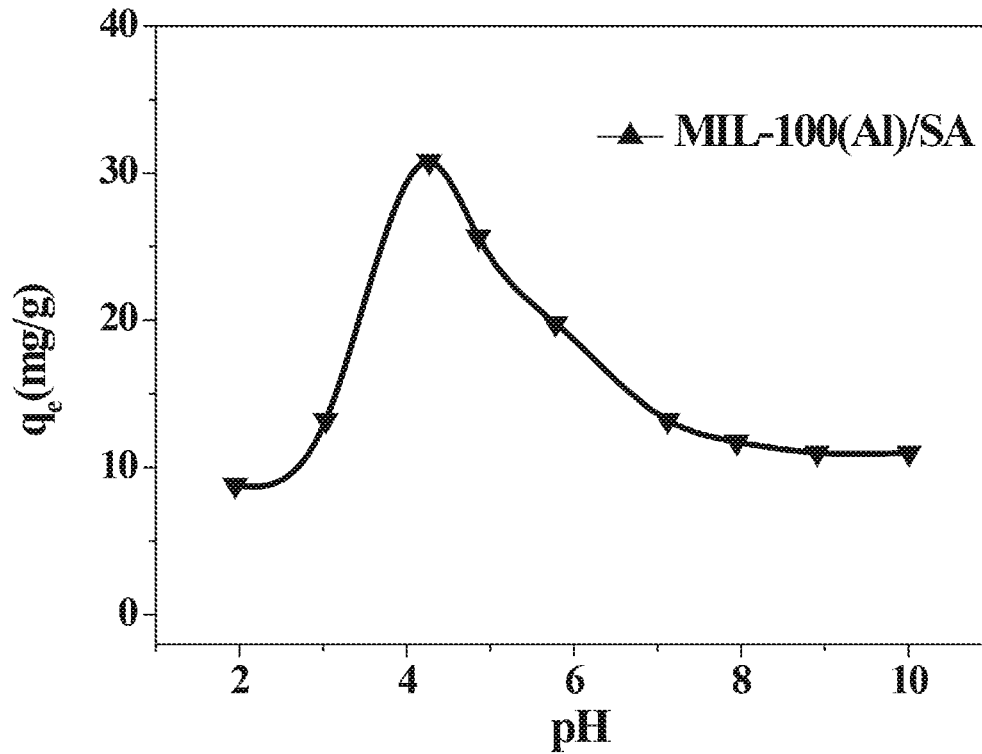
FIG. 13 depicts results for adsorbing capacities of the benzoic acid, from water by MIL-100(Al)/sodium alginate beads with the various pH.
Figure 14:
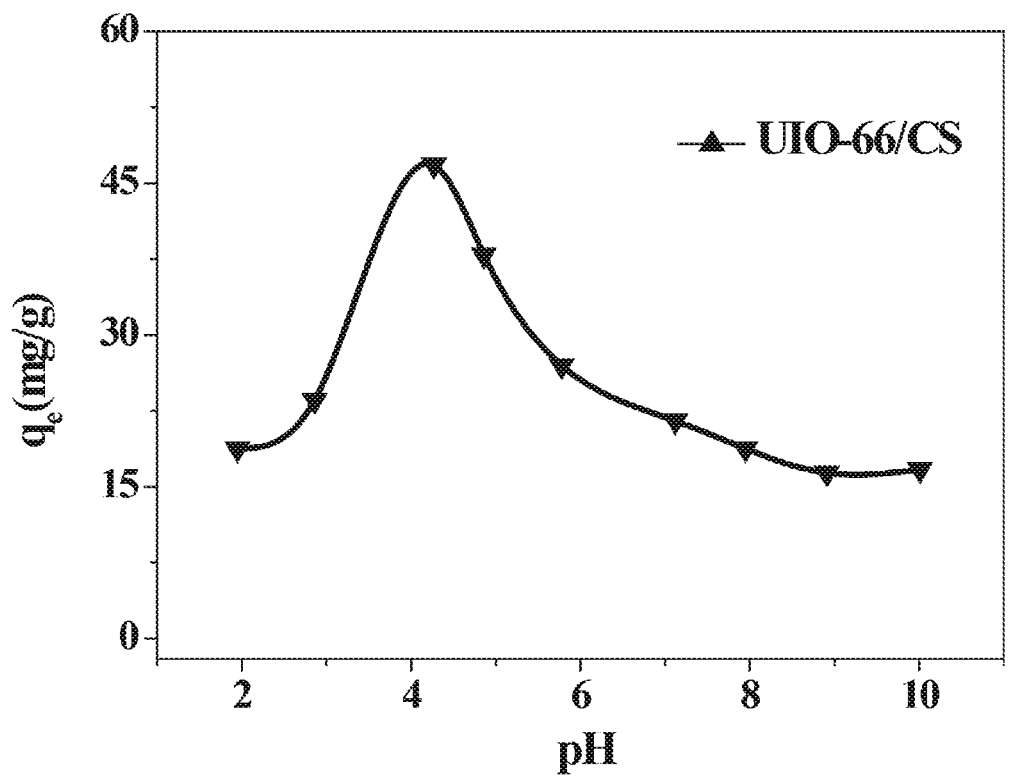
FIG. 14 depicts results for adsorbing capacities of the benzoic acid, from water by UIO-66/chitosan beads with the various pH.
Figure 15:
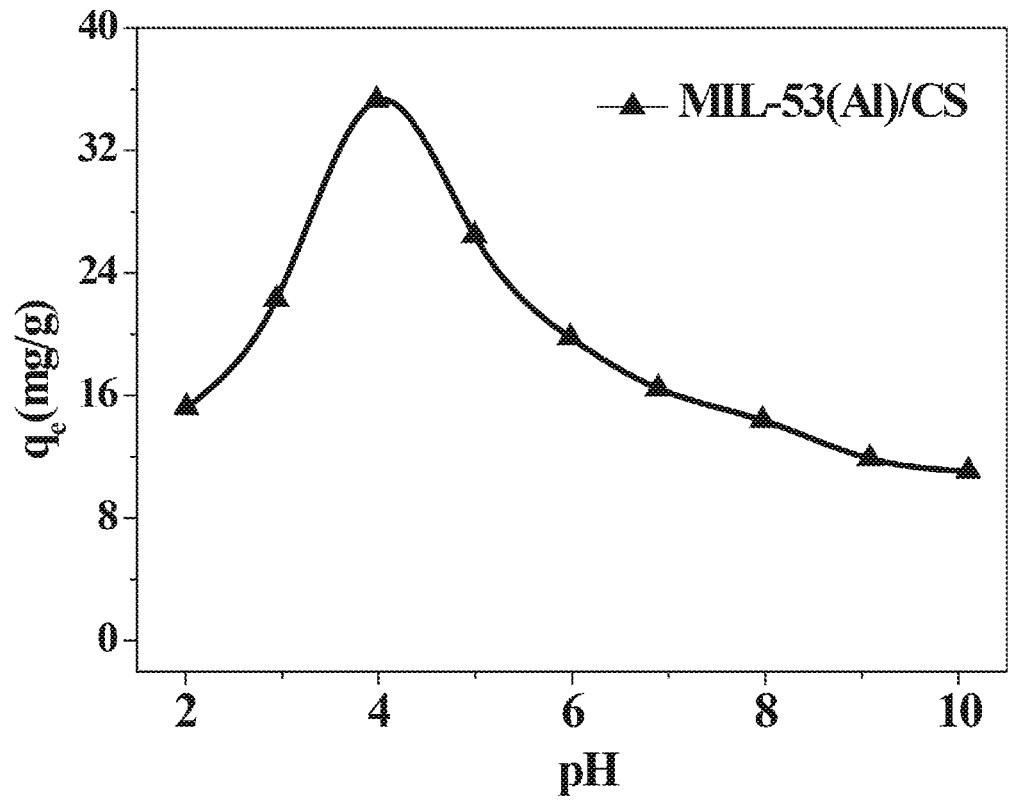
FIG. 15 depicts results for adsorbing capacities of the benzoic acid, from water by MIL-53(Al)/chitosan beads with the various pH.
Figure 16:
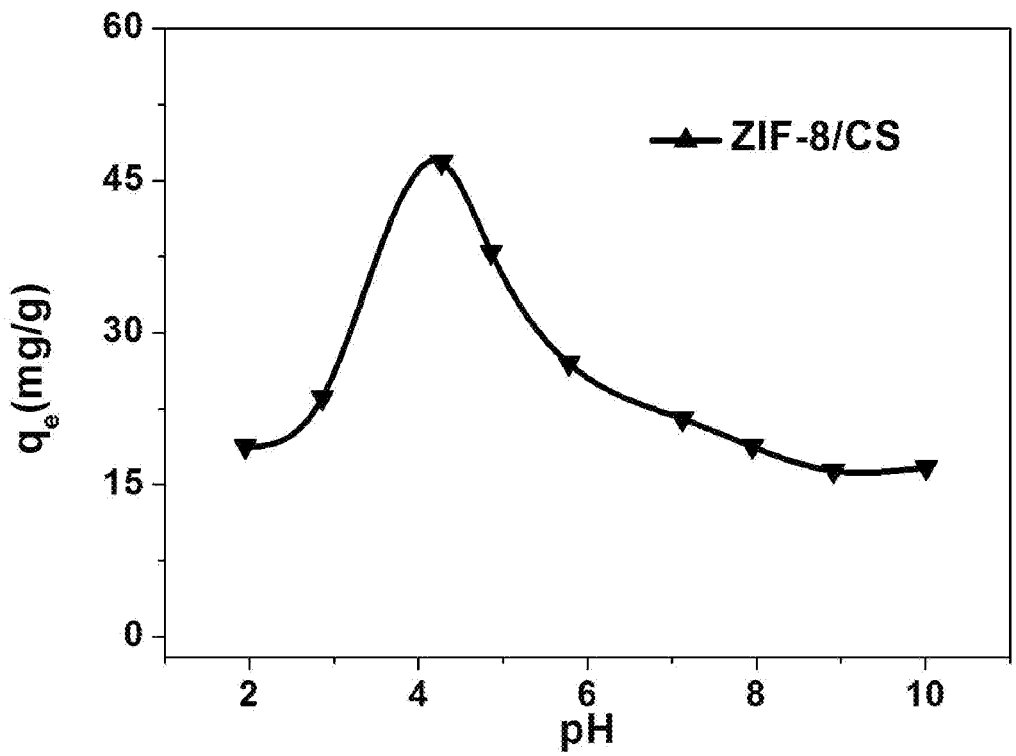
FIG. 16 depicts results for adsorbing capacities of the benzoic acid, from water by ZIF-8/chitosan beads with the various pH.
Figure 17:
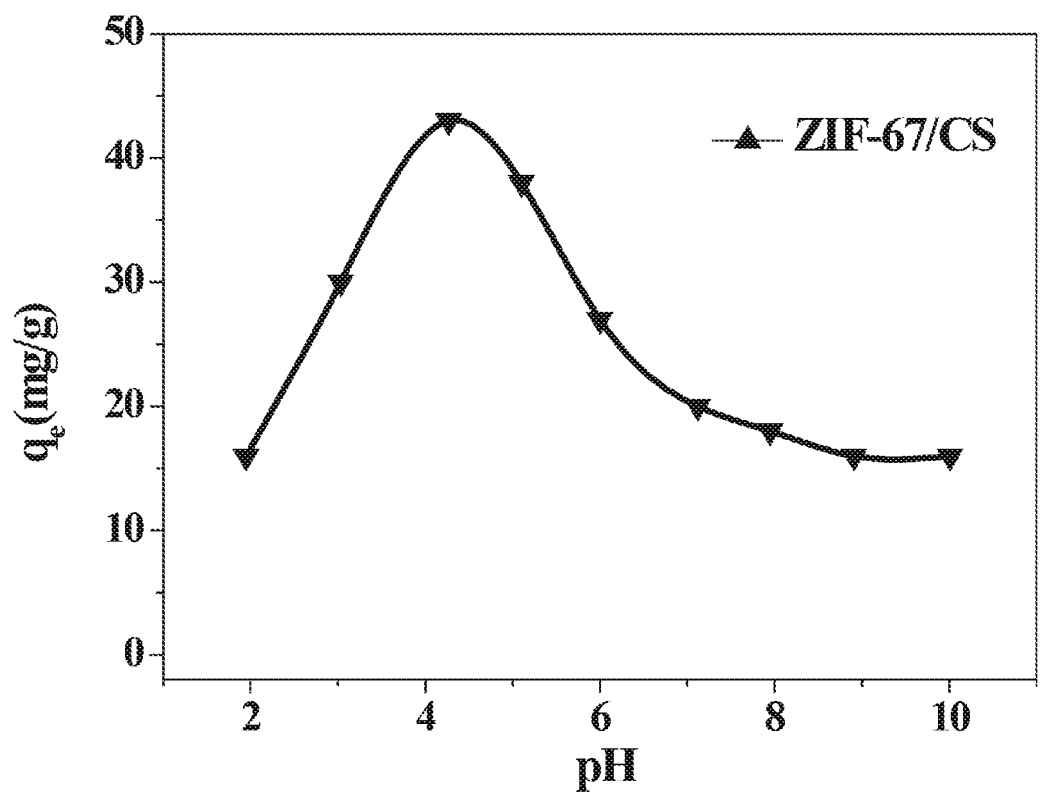
FIG. 17 depicts results for adsorbing capacities of the benzoic acid, from water by ZIF-67/chitosan beads with the various pH.

FIG. 13 shows effect of pH on adsorption capacities of benzoic acid. As shown in FIG. 2, SA beads are negatively charged, which could not attract the benzoic acid anions any more. MIL-100(Al)/SA>SA could attract the benzoic acid, suggesting that the presence of MIL-100(Al) nanopower plays a significant role in improving the interactions between the adsorbates and the composite beads.

FIG. 14, FIG. 15, FIG. 16 and FIG. 17 shows effect of pH on adsorption capacities of benzoic acid. As shown in FIG. 2, CS beads are positively charged, which could attract the benzoic acid anions. The maximum ($q_{max}$) capacities of UIO-66/CS, MIL-53(Al)/CS, ZIF-8/CS and ZIF-67/CS for benzoic acid, ibuprofen and ketoprofen were observed to be 46, 36, 47 and 44 mg·$g^{-1}$. All adsorption amounts of adsorbents follow the order of MOFs/CS>CS to benzoic acid, suggesting that the presence of MOFs plays a significant role in improving the interactions between the adsorbates and the composite beads.

CONCLUSION

The composite beads (MIL-101(Cr)/SA and MIL-101 (Cr)/CS) with average diameter of 1-3 mm were synthesized via a two-step method. FTIR and XRD confirmed that MIL-101(Cr) has been successfully incorporated to the composite beads and the ordered nanopore-structure of MIL-101(Cr) is preserved well. The maximum ($q_{max}$) capacities of MIL-101(Cr)/CS for benzoic acid, ibuprofen and ketoprofen were observed to be 66.5, 103.2 and 156.6 mg·$g^{-1}$. The adsorption capacities of the present beads were much higher for benzoic acid, ibuprofen and ketoprofen when compared to the already sodium alginate and chitosan beads. The combination of processing MIL-101(Cr) compositing significantly increased the adsorption capacities of pure natural polymers.

The same methods were also applied to prepare other MIL-100(Al)/SA, UIO-66/CS, MIL-53(Al)/CS, ZIF-8/CS and ZIF-67/CS. FTIR confirmed that the above MOFs has been successfully incorporated to the composite beads well. The adsorption capacities of the present systems were much higher for benzoic acid compared to the already sodium alginate or chitosan beads. The combination of processing MOFs compositing significantly increased the adsorption capacities of pure natural polymers.

The features disclosed in the foregoing description, the claims and/or in the accompanying drawing may, both separately and in any combination thereof, by material for realizing the invention in diverse forms.

What is claimed is:

1. A method for preparing MOFs/natural polymers composite beads, wherein the beads comprises natural polymers as matrix and MOFs within the matrix, and wherein the natural polymers are chitosan, comprising of the steps of:
    (1) preparing MOFs nano-powders by the sub-steps of:
        blending metallic salt compounds, organic ligands compounds, and solvent;
        sonicating the blended mixture, placing the mixture in a Teflon-lined autoclave bomb, and keeping the mixture in an oven at 25-220° C. for 3-96 hours without stirring to synthesize crude MOFs; and
        separating synthesized crude MOFs solids from water using a centrifuge (8000 rpm, 10 minutes), washing the solids with methanol or ethanol, separating the methanol or ethanol from the solids by centrifugation, placing the solids in ethanol or DMF, sonicating the the solids for 10 minutes, keeping the solids at 70° C.; separating the resulting solids by centrifugation, repeatedly washing with ethanol or DMF, and drying the solids under vacuum at 80-140° C. for 2 days to form the MOFs nano-powders;
    (2) adding the MOFs nano-powders from step (1) and natural polymers were-added to a water or acetic acid solution and mixing together to obtain a homogeneous MOFs-natural polymers solution;
    (3) preparing either a $CaCl_2$-ethanol-$H_2O$ solution at pH=1-4 or a $Na_5P_3O_{10}$-ethanol-$H_2O$ solution;
    (4) dropping the homogeneous MOFs-natural polymers solution from step (2) to the solution from step (3) to obtain the MOFs/natural polymers composite beads; and
    (5) suspending the MOFs/natural polymers composite beads suspended in a cross-linking reaction medium containing glutaraldehyde at pH=0.5-2 and 10-40° C. for 6-24 hours, or at pH=4-7 and 25-50° C. for 6-24 hours.

2. The method for preparing the MOFs/natural polymers composite beads according to claim 1, wherein the metallic salt compounds of the step 1 comprise $Cr(NO_3)_3 \cdot 9H_2O$, $Al(NO_3)_3 \cdot 9H_2O$, $Co(NO_3)_3 \cdot 6H_2O$, $ZrCl_4$, $Zn(NO_3)_2$ or $AlCl_3$; the organic ligands compounds comprise terephthalic acid, trimesic acid, 2-aminotetrephthalic acid, methylimidazole, nitroimidazole or benzimidazole; wherein the mass ratio of the metal salt compounds and the organic ligands are about-(0.25-2.41):1; the solvents for the step (1) reaction are 0.3-20% HF solution, $HNO_3$ solution or DMF; and wherein the mass ratio of the sum of the metallic salt compounds and the organic ligands versus the reaction solvents are (0.04-0.10):−1.

3. The method for preparing the MOFs/natural polymers composite beads according to claim 1, wherein the mass ratio of the natural polymers, the MOFs and water are about 1:(0.1-1.0):5.

4. The method for preparing the MOFs/natural polymers composite beads according to claim 1, wherein the mass ratio of $CaCl_2$ or $Na_5P_3O_{10}$, ethanol and water are about (0.08-0.12):1:1.

5. The method for preparing the MOFs/natural polymers composite beads according to claim 1, wherein the volume ratio of the homogeneous MOFs-natural polymers solution and $CaCl_2$-ethanol-water or $Na_5P_3O_{10}$-ethanol-water solution are 1:(3-6); the homogeneous MOFs-natural polymers solution are dropped at the speed of 5-40 mL/minute; and the $CaCl_2$-ethanol-water or $Na_5P_3O_{10}$-ethanol-water solution is stirred at the speed of 20-60 rpm when dropping the homogeneous MOFs-natural polymers solution to the $CaCl_2$-ethanol-$H_2O$ solution or the $Na_5P_3O_{10}$-ethanol-$H_2O$ solution.

6. The method for preparing the MOFs/natural polymers composite beads according to claim 5, wherein the mass ratio of the composite beads and glutaraldehyde solution is 3:(10-40) and the mass fraction of glutaraldehyde is about 0.5%-3.5%.

7. The method for preparing the MOFs/natural polymers composite beads according to claim 4, wherein the volume ratio of the homogeneous MOFs-natural polymers solution and $CaCl_2$-ethanol-water or $Na_5P_3O_{10}$-ethanol-water solution are 1:(3-6); the homogeneous MOFs-natural polymers solution are dropped at the speed of 5-40 mL/minute; and the $CaCl_2$-ethanol-water or $Na_5P_3O_{10}$-ethanol-water is stirred at the speed of 20-60 rpm when dropping the homogeneous MOFs-natural polymers solution to the $CaCl_2$-ethanol-$H_2O$ solution or the $Na_5P_3O_{10}$-ethanol-$H_2O$ solution.

8. The method for preparing the MOFs/natural polymers composite beads according to claim 7, wherein the mass ratio of the composite beads and glutaraldehyde solution is 3:(10-40) and the mass fraction of glutaraldehyde is about 0.5%-3.5%.

9. The method for preparing the MOFs/natural polymers composite beads according claim 1, further comprising the step of applying the MOFs/natural polymers composite beads to water treatment and resources recovery.

* * * * *